US009962756B2

(12) United States Patent
Tang et al.

(10) Patent No.: US 9,962,756 B2
(45) Date of Patent: May 8, 2018

(54) ELECTRONIC DEVICE CASE AND METHOD OF FORMING HANGING LUG IN ELECTRONIC DEVICE CASE

(71) Applicant: Wistron Corporation, New Taipei (TW)

(72) Inventors: Miao-Chun Tang, New Taipei (TW); Xiao-Quan Ding, New Taipei (TW); Nan-Zeng Zhou, New Taipei (TW); Ji-Tao Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 345 days.

(21) Appl. No.: 14/863,152

(22) Filed: Sep. 23, 2015

(65) Prior Publication Data

US 2016/0374216 A1 Dec. 22, 2016

(30) Foreign Application Priority Data

Jun. 19, 2015 (CN) .......................... 2015 1 0350912

(51) Int. Cl.
*H05K 5/00* (2006.01)
*B21D 51/52* (2006.01)
*G06F 1/18* (2006.01)

(52) U.S. Cl.
CPC ............... *B21D 51/52* (2013.01); *G06F 1/18* (2013.01)

(58) Field of Classification Search
None
See application file for complete search history.

(56) References Cited

U.S. PATENT DOCUMENTS 5,373,104 A * 12/1994 Brauer ................. H05K 5/0013 174/562
5,691,504 A * 11/1997 Sands ..................... G06F 1/182 174/372
5,801,928 A * 9/1998 Burstedt ................ H05K 7/142 361/752
5,951,307 A * 9/1999 Klein ....................... H01R 4/64 439/92
6,367,896 B1 * 4/2002 Peng ....................... G06F 1/181 292/80
6,462,954 B1 * 10/2002 Kuo ....................... H05K 3/325 361/736
6,628,515 B2 * 9/2003 Chen ....................... G06F 1/184 248/535
6,894,891 B2 * 5/2005 Darr ....................... H05K 7/142 361/601

(Continued)

*Primary Examiner* — Xanthia C Cunningham
(74) *Attorney, Agent, or Firm* — Muncy, Geissler, Olds & Lowe, P.C.

(57) ABSTRACT

An electronic device case which includes a bottom shell, a plurality of side shells, a first hanging lug and a second hanging lug is disclosed. The side shells are connected to the bottom shell. The first hanging lug is located on one of the side shells. The first hanging lug includes a first top plate, a first supporting plate, a first hole and a first arch bridge part. The first supporting plate is connected to the first top plate. The first hole is located on the first top plate. The first arch bridge part supports the first top plate. The second hanging lug is located on the bottom shell. The second hanging lug includes a second top plate and a second supporting plate. The second supporting plate is connected to the second top plate.

10 Claims, 15 Drawing Sheets

(56) References Cited

U.S. PATENT DOCUMENTS

| | | | | |
|---|---|---|---|---|
| 7,040,905 | B1 * | 5/2006 | Wang | H05K 7/1404 361/759 |
| 7,072,176 | B2 * | 7/2006 | Lin | G06F 1/184 174/138 G |
| 7,208,686 | B1 * | 4/2007 | Chen | G06F 1/181 174/559 |
| 7,477,528 | B2 * | 1/2009 | Kim | H05K 5/02 361/752 |
| 8,315,062 | B2 | 11/2012 | Lin | |
| 8,462,515 | B2 | 6/2013 | Gong et al. | |
| 8,752,911 | B2 * | 6/2014 | Dernier | H05K 5/0013 292/91 |
| 8,824,157 | B2 * | 9/2014 | Fan | G06F 1/186 248/674 |
| 9,081,551 | B2 * | 7/2015 | Hsiao | G06F 1/181 |
| 9,497,878 | B2 * | 11/2016 | Huang | H05K 7/1417 |
| 9,743,544 | B2 * | 8/2017 | Gommel | H05K 5/0247 |
| 2002/0106952 | A1 * | 8/2002 | Hashizume | B29C 45/14221 442/43 |
| 2003/0214791 | A1 * | 11/2003 | Hung | H05K 7/1417 361/758 |
| 2005/0068718 | A1 * | 3/2005 | Cheng | F16M 11/041 361/679.22 |
| 2006/0209508 | A1 * | 9/2006 | Han | G06F 1/184 361/679.37 |
| 2011/0115349 | A1 * | 5/2011 | Dernier | H05K 5/0013 312/223.1 |
| 2013/0120945 | A1 * | 5/2013 | Zhao | H05K 7/142 361/759 |

* cited by examiner

ELECTRONIC DEVICE CASE AND METHOD OF FORMING HANGING LUG IN ELECTRONIC DEVICE CASE

BACKGROUND OF THE INVENTION

1. Field of the Invention

The present disclosure relates to an electronic device case; more particularly, the present disclosure relates to an electronic device case with a hanging lug which can withstand a high load.

2. Description of the Related Art

In modern society, electronic devices (such as computers or touch-screen devices) provide a certain amount of convenience and entertainment; therefore, the consumer usually uses such electronic devices in the office or at home. A common electronic device has a case and a circuit board. The case has a hanging lug structure, and the hanging lug structure is used for allowing the screw to lock the circuit board such that the circuit board can be combined with the case stably.

The hanging lug structure of the prior art is produced by cutting a rectangular sheet from the case and bending the sheet such that part of the sheet is perpendicular to the case to form a supporting board. The other part of the sheet is parallel to the case to form a top board, the top board is vertically connected to the supporting board, and the top board has a screw hole. A screw can pass through the screw hole of the top board and the circuit board for locking, such that the circuit board can be combined with the top board of the hanging lug structure. However, when locking the screw, if the assembler applies too much force, the sheet of the top board or the supporting board may be deformed easily; such deformation can diminish the overall structural strength of the case or the stability of the combination of the circuit board and the case.

Therefore, there is a need to provide a new case of the electronic device with a hanging lug which can withstand a high load.

SUMMARY OF THE INVENTION

It is an object of the present disclosure to provide an electronic device case with a hanging lug which can withstand a high load.

To achieve the abovementioned object, an electronic device case of the present disclosure includes a bottom shell, a plurality of side shells, a first hanging lug and a second hanging lug. The plurality of side shells are connected to the bottom shell. The first hanging lug is located on one of the side shells, and the first hanging lug includes a first top plate, a first supporting plate, a first hole and a first arch bridge part. The first supporting plate is connected to the first top plate. The first hole is located on the first top plate. The first arch bridge part supports the first top plate. The second hanging lug is located on the bottom shell, and the second hanging lug includes a second top plate and a second supporting plate. The second supporting plate includes a second main supporting plate and at least one second side supporting plate. The second main supporting plate is connected to the second top plate. The at least one second side supporting plate is connected to the second main supporting plate and supports the second top plate.

According to one embodiment of the present disclosure, the electronic device case further includes a third hanging lug, and the third hanging lug is located at a junction of any two neighboring side shells. The third hanging lug includes a third top plate, a third hole and a third arch bridge part. The third top plate is connected to one of the two neighboring side shells. The third hole is located on the third top plate. The third arch bridge part is connected to the other one of the two neighboring side shells and supports the third top plate.

According to one embodiment of the present disclosure, the electronic device case further includes a fourth hanging lug, and the fourth hanging lug is located at a junction of one of the plurality of side shells and the bottom shell. The fourth hanging lug includes a fourth top plate, a fourth supporting plate and a fourth hole. The fourth top plate is connected to the side shell. The fourth supporting plate is connected to the fourth top plate and the bottom shell. The fourth hole is located on the fourth top plate.

According to one embodiment of the present disclosure, the second hanging lug further includes a second hole. The second hole is located on the second top plate.

According to one embodiment of the present disclosure, the first hanging lug further includes a first reinforcing rib. The first reinforcing rib is located on the first supporting plate.

According to one embodiment of the present disclosure, the first hanging lug further includes a first foolproof part. The first foolproof part is located on the first top plate.

According to one embodiment of the present disclosure, the second hanging lug further includes a second reinforcing rib. The second reinforcing rib is located on the second main supporting plate.

According to one embodiment of the present disclosure, the third hanging lug further includes a third foolproof part. The third foolproof part is located on the third top plate.

According to one embodiment of the present disclosure, a distance between the bottom shell and the first top plate, the second top plate, the third top plate and the fourth top plate is between 15 and 35 millimeters.

According to one embodiment of the present disclosure, a thickness of the bottom shell and the side shell is between 0.38 and 0.52 millimeters.

It is another object of the present disclosure to provide a method of forming hanging lug in electronic device case to produce a hanging lug which can withstand a high load.

To achieve the abovementioned object, the method of forming hanging lug in electronic device case of the present disclosure is applied to an electronic device case, wherein the electronic device case includes a bottom shell and a plurality of side shells and the plurality of side shells are connected to the bottom shell. The method of forming hanging lug in electronic device case includes: cutting one of the plurality of side shells to form a first sheet; bending the first sheet such that the first sheet is perpendicular to the side shell; cutting the first sheet at a break angle to form a first top plate and a first supporting plate, wherein the first top plate is connected to the first supporting plate and the first supporting plate is connected to the side shell; bending the first top plate such that the first top plate is perpendicular to the first supporting plate; perforating the first top plate to form a first hole; stamping the side shell under the first top plate to form a first arch bridge part, wherein the first arch bridge part supports the first top plate, thereby forming a first hanging lug; cutting the bottom shell to form a second sheet; bending the second sheet such that the second sheet is perpendicular to the bottom shell; cutting the second sheet to form a second top plate and a second supporting plate, wherein the second supporting plate comprises a second main supporting plate and at least one second side supporting plate, the second main supporting plate is connected to the second top plate and the bottom shell, and the at least one second side supporting plate is connected to the second main supporting plate; bending the second top plate such that the second top plate is perpendicular to the second main supporting plate; bending the at least one second side supporting plate such that the at least one second side supporting plate supports the second top plate, thereby forming a second hanging lug.

According to one embodiment of the present disclosure, the method of forming a hanging lug in an electronic device further includes: at a junction of any two neighboring side shells, cutting one of the side shells to form a third sheet; bending the third sheet such that the third sheet is perpendicular to the other one side shell to form a third top plate; perforating the third top plate to form a third hole; and stamping the other one side shell under the third top plate to form a third arch bridge part, wherein the third arch bridge part supports the third top plate, thereby forming a third hanging lug.

According to one embodiment of the present disclosure, the method of forming hanging lug in electronic device case further includes: at a junction of one of the plurality of side shells and the bottom shell, cutting the one of the plurality of side shells and the bottom shell to form a fourth sheet; bending the fourth sheet such that a part of the fourth sheet is perpendicular to the bottom shell to form a fourth supporting plate, and another part of the fourth sheet is perpendicular to the one of the plurality of side shells to form a fourth top plate, wherein the fourth top plate is connected to the one of the plurality of side shells and the fourth supporting plate is connected to the fourth top plate and the bottom shell; and perforating the fourth top plate to form a fourth hole, thereby forming a fourth hanging lug.

According to one embodiment of the present disclosure, the method of forming hanging lug in electronic device case further includes: stamping the first supporting plate to form a first reinforcing rib.

According to one embodiment of the present disclosure, the step of forming a second hanging lug further includes: perforating the second top plate to form a second hole.

According to one embodiment of the present disclosure, the method of forming hanging lug in electronic device case further includes: cutting the first top plate to form a first foolproof sheet; and bending the first foolproof sheet to form a first foolproof part.

According to one embodiment of the present disclosure, the method of forming hanging lug in electronic device case further includes: stamping the second main supporting plate to form a second reinforcing rib.

According to one embodiment of the present disclosure, the method of forming hanging lug in electronic device case further includes: cutting the third top plate to form a third foolproof sheet; and bending the third foolproof sheet to form a third foolproof part.

DETAILED DESCRIPTION OF THE PREFERRED EMBODIMENT

These and other objects and advantages of the present disclosure will become apparent from the following descriptions of the accompanying drawings, which disclose several embodiments of the present disclosure. It is to be understood that the drawings are to be used for purposes of illustration only, and not as a definition of the disclosure.

Figure 1:
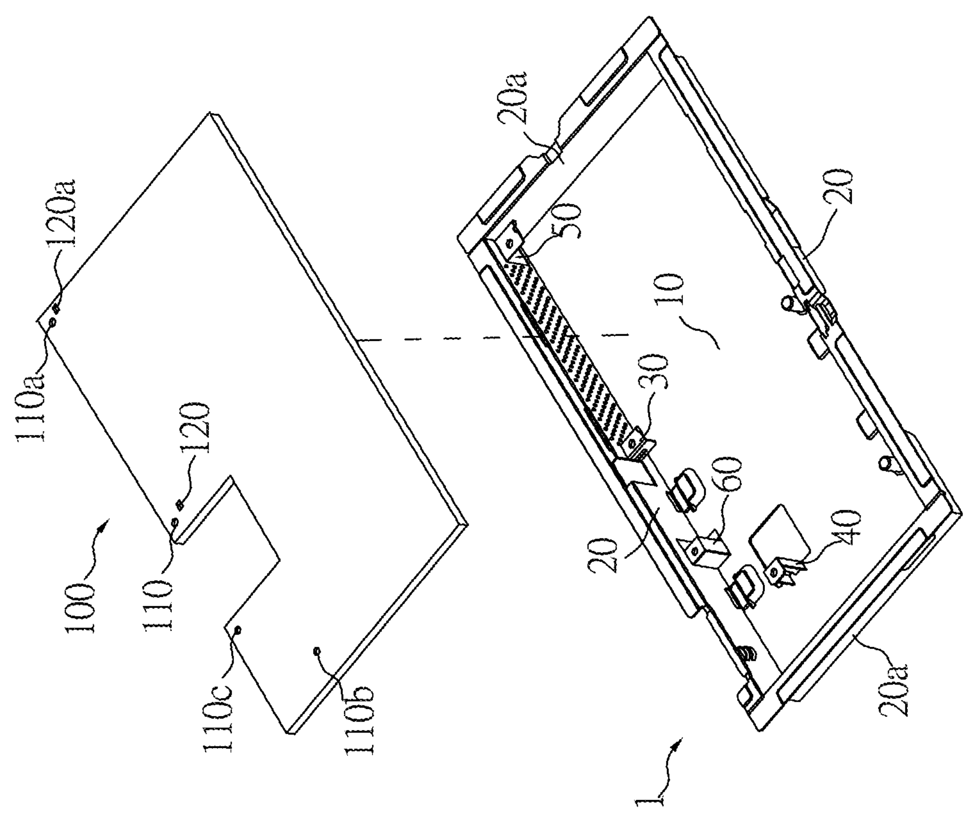
FIG. 1 illustrates a schematic drawing of the electronic device case of one embodiment of the present disclosure.
Figure 4C:
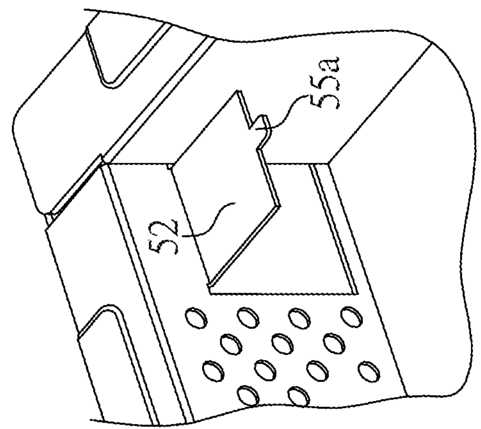
FIG. 4C illustrates a schematic drawing of cutting the third top plate to form the third foolproof sheet of one embodiment of the present disclosure.
Figure 4B:
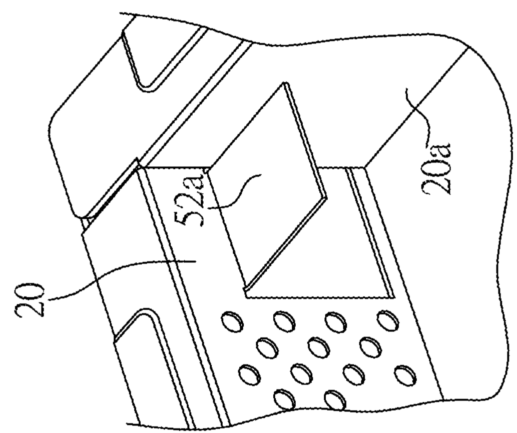
FIG. 4B illustrates a schematic drawing of bending the third sheet of one embodiment of the present disclosure.
Figure 4A:
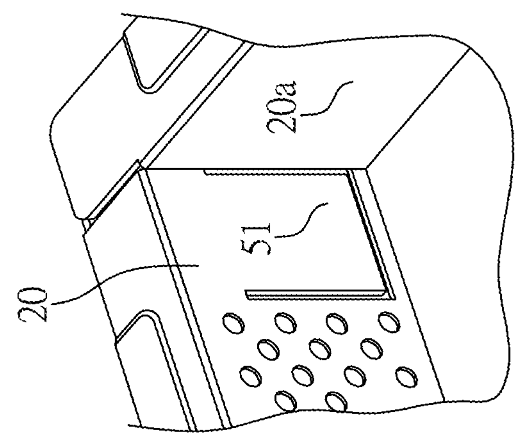
FIG. 4A illustrates a schematic drawing of cutting one of the side shells to form the third sheet at the junction of any two neighboring side shells of one embodiment of the present disclosure.
Figure 4F:
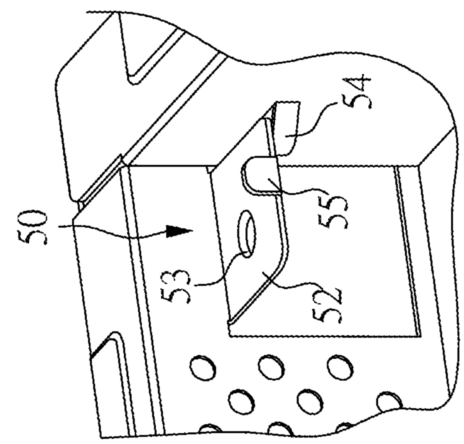
FIG. 4F illustrates a schematic drawing of forming the third arch bridge part to form the third hanging lug of one embodiment of the present disclosure.
Figure 4E:
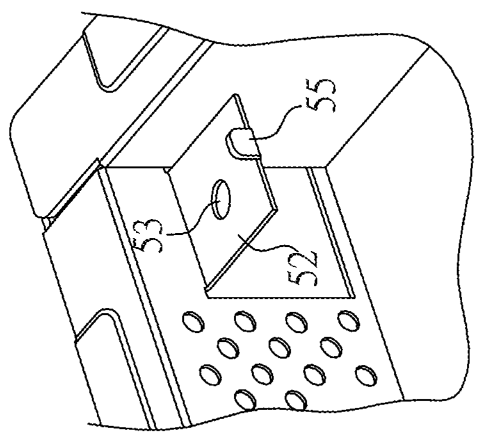
FIG. 4E illustrates a schematic drawing of forming the third hole of one embodiment of the present disclosure.
Figure 4D:
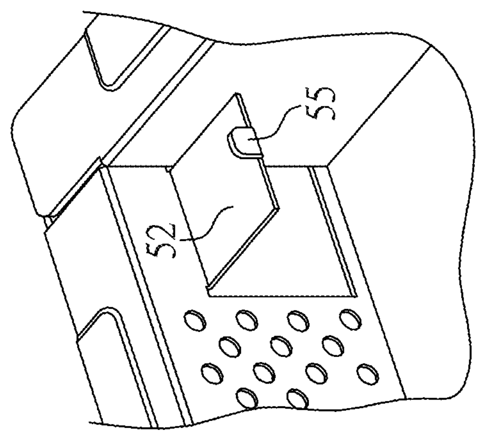
FIG. 4D illustrates a schematic drawing of bending the third foolproof sheet to form the third foolproof part of one embodiment of the present disclosure.
Figure 4G:
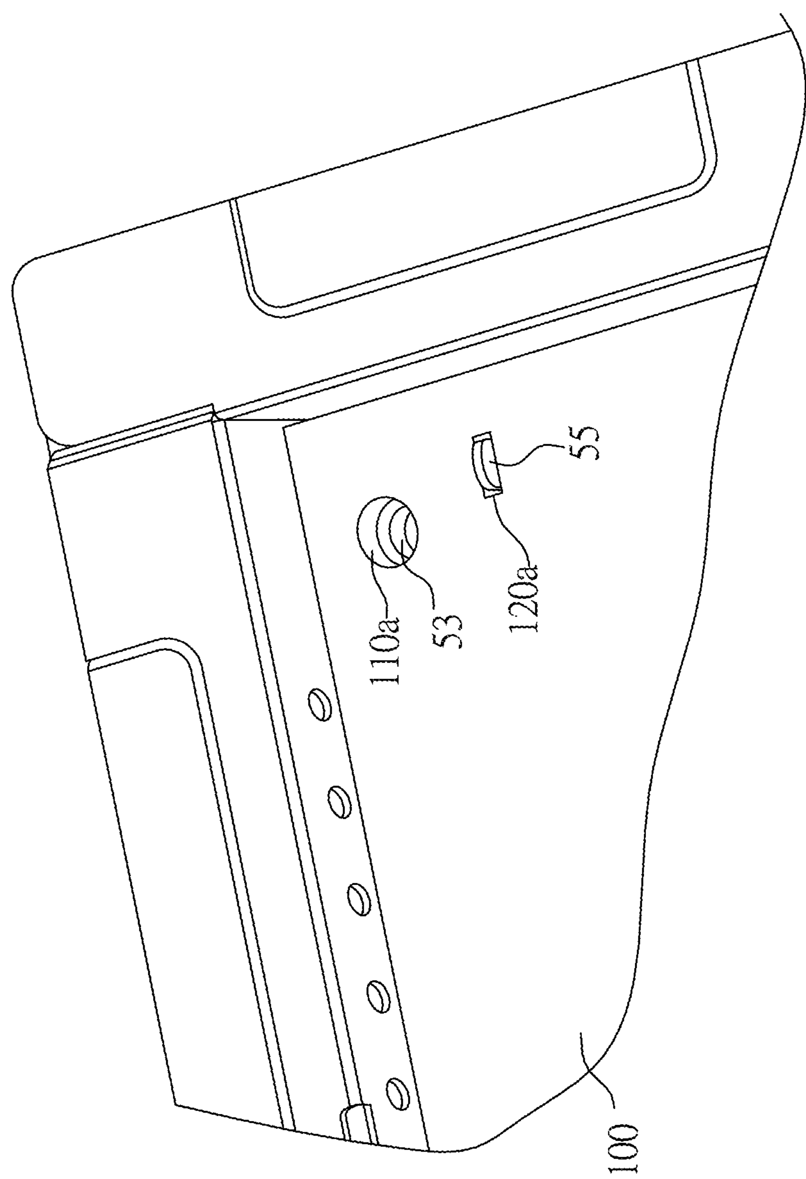
FIG. 4G illustrates a schematic drawing of combining the foolproof hole of the circuit board and the third foolproof part of one embodiment of the present disclosure.
Figure 5C:
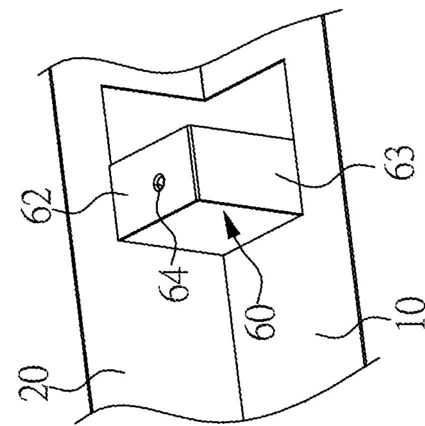
FIG. 5C illustrates a schematic drawing of forming the fourth hole to form the fourth hanging lug of one embodiment of the present disclosure.
Figure 5B:
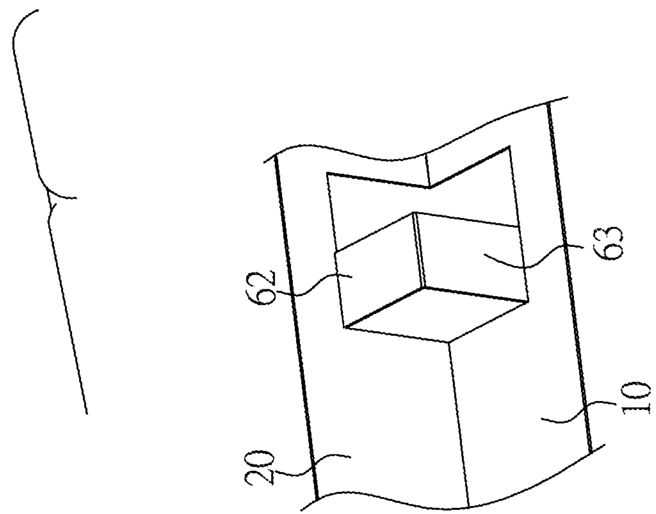
FIG. 5B illustrates a schematic drawing of bending the fourth sheet to form the fourth top plate and the fourth supporting plate of one embodiment of the present disclosure.
Figure 5A:
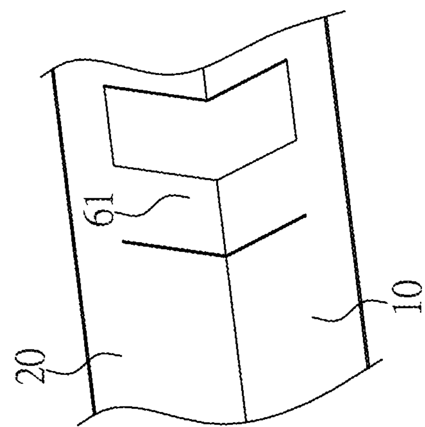
FIG. 5A illustrates a schematic drawing of cutting the side shell and the bottom shell to form the fourth sheet at the junction of one of the side shells and the bottom shell of one embodiment of the present disclosure.
Figure 6:
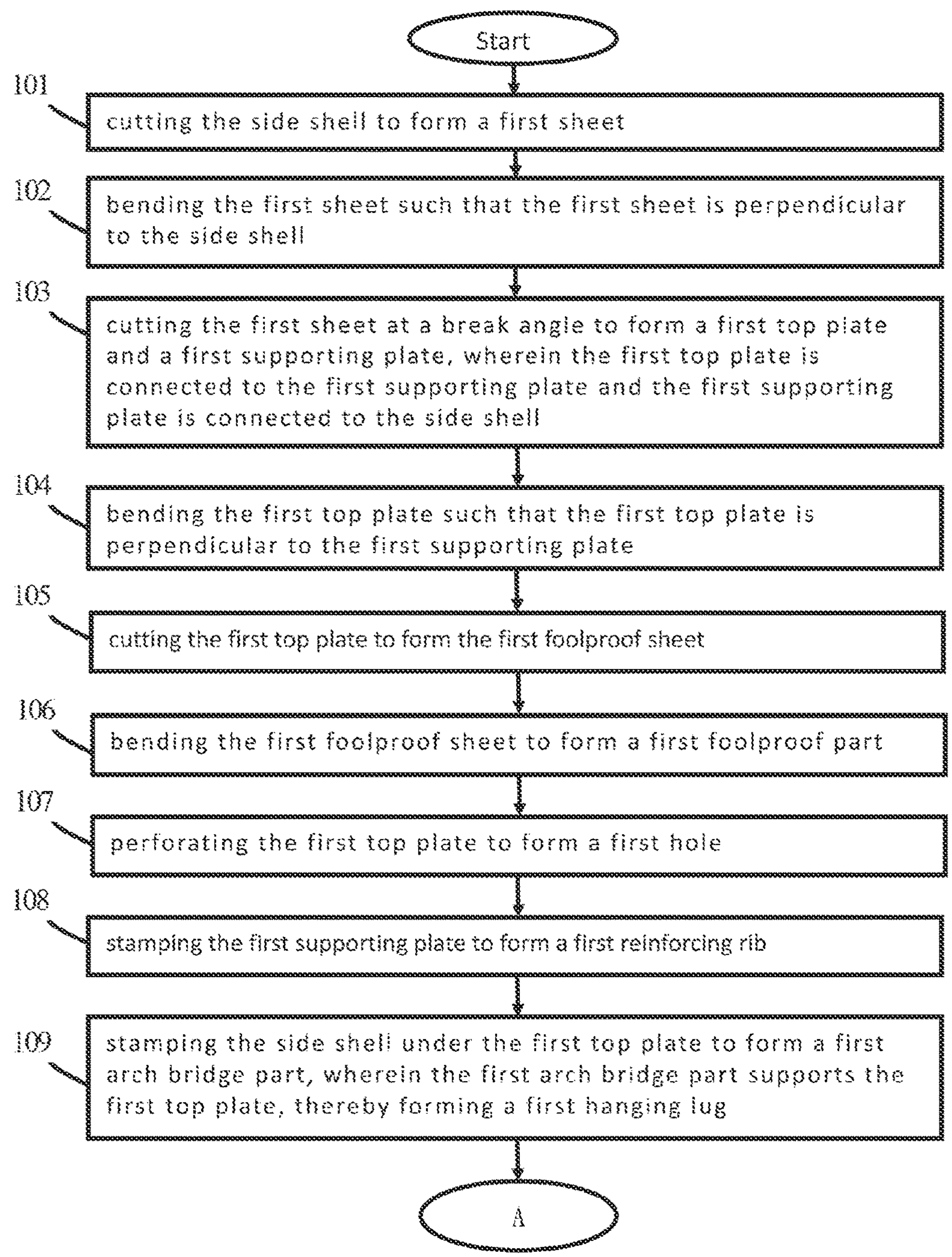
FIG. 6 illustrates the first part of the flowchart of the method of forming hanging lug in electronic device case of one embodiment of the present disclosure.
Figure 7:
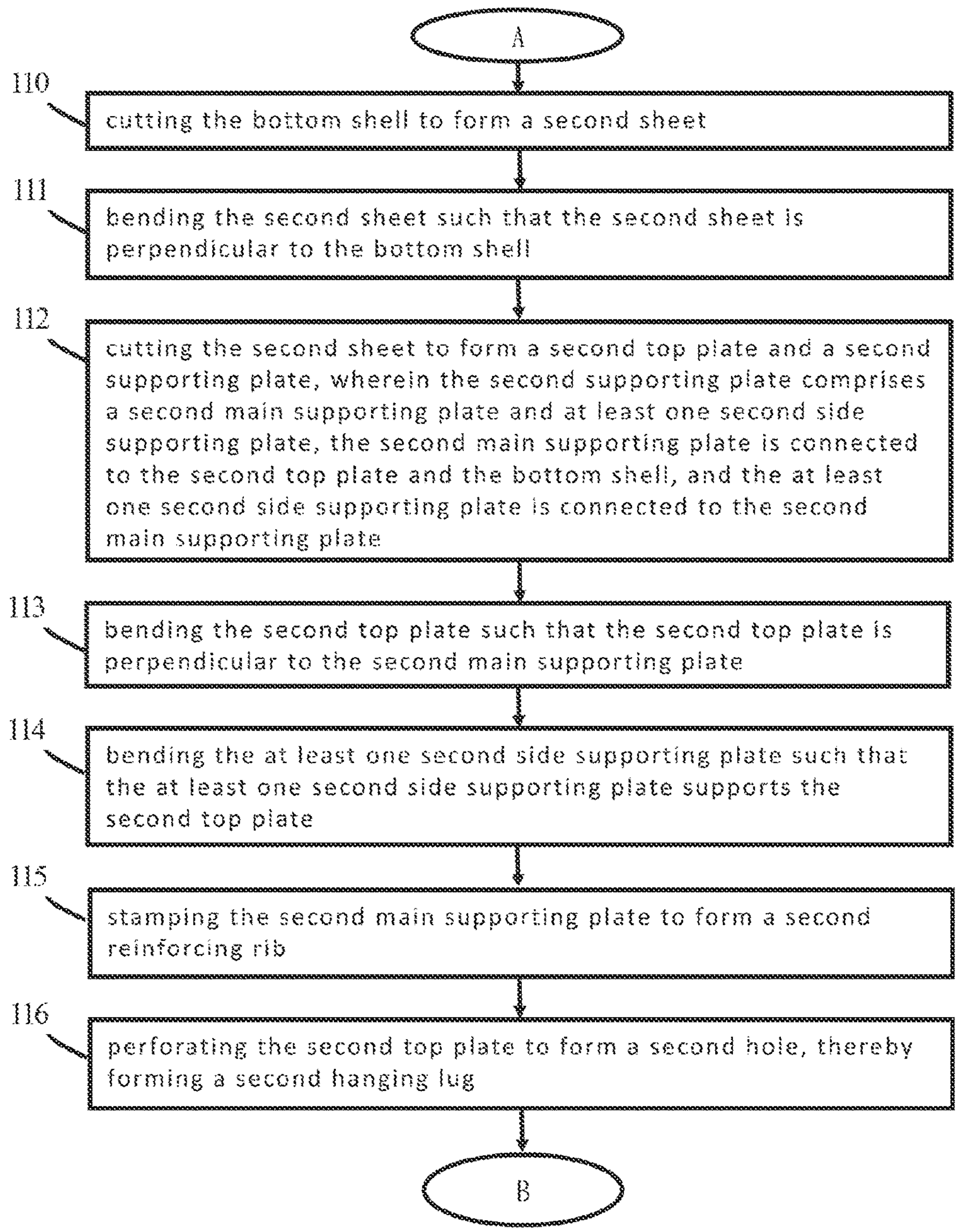
FIG. 7 illustrates the second part of the flowchart of the method of forming hanging lug in electronic device case of one embodiment of the present disclosure.
Figure 8:
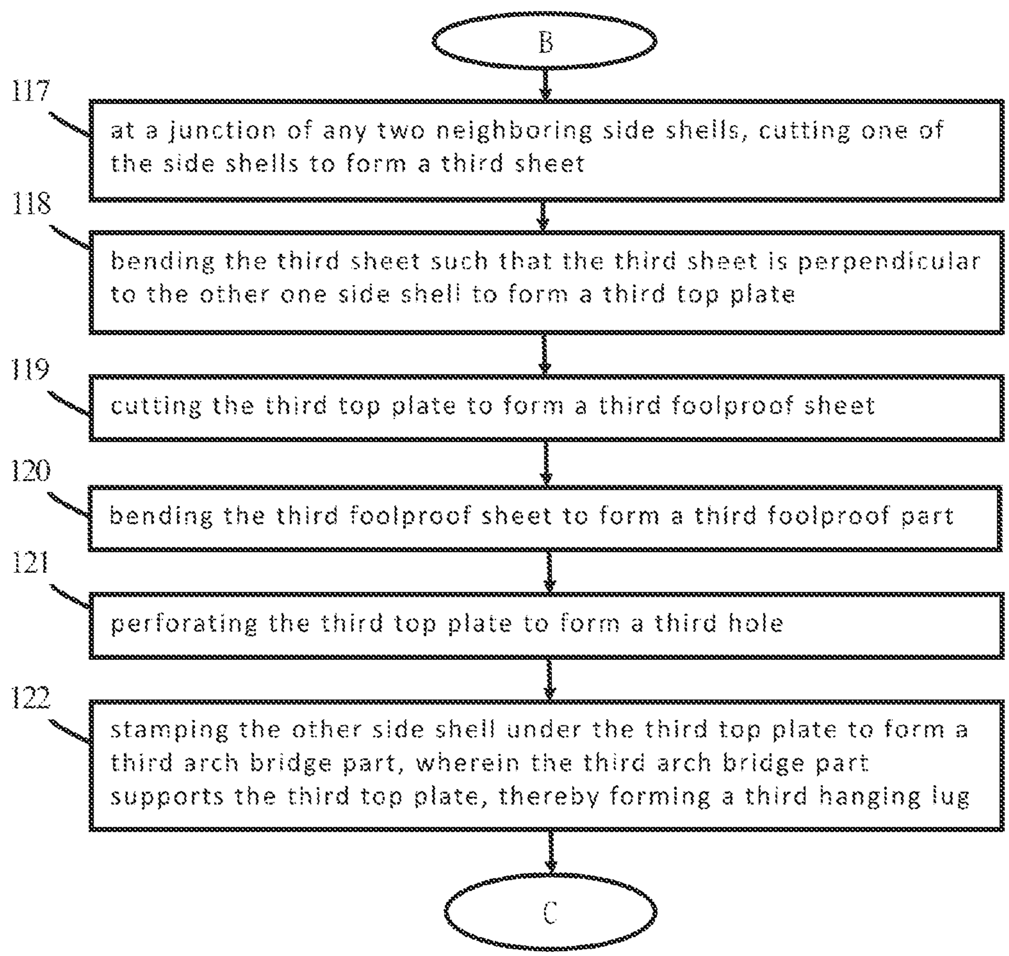
FIG. 8 illustrates the third part of the flowchart of the method of forming hanging lug in electronic device case of one embodiment of the present disclosure.
Figure 9:
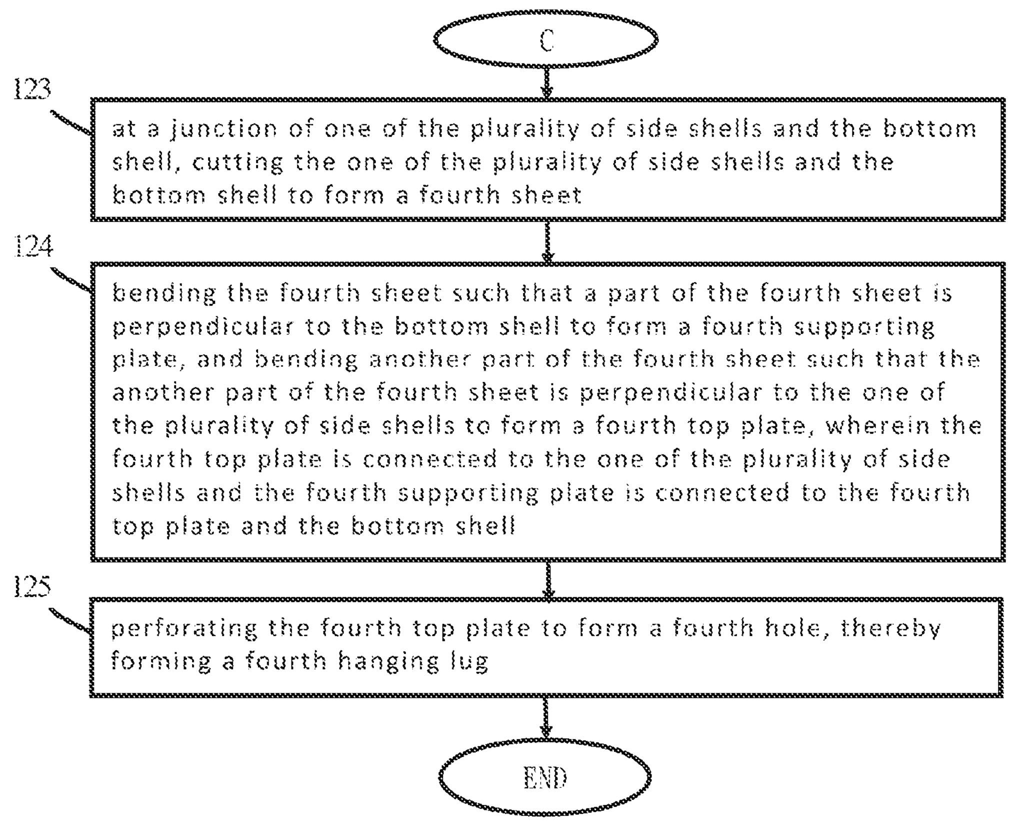
FIG. 9 illustrates the fourth part of the flowchart of the method of forming hanging lug in electronic device case of one embodiment of the present disclosure.

Please refer to FIG. 1 to FIG. 9, which present the electronic device case and the method of forming hanging lug in electronic device case of the present disclosure. FIG. 1 illustrates a schematic drawing of the electronic device case of one embodiment of the present disclosure. FIG. 2A illustrates a schematic drawing of cutting the side shell to form the first sheet of one embodiment of the present disclosure. FIG. 2B illustrates a schematic drawing of bending the first sheet of one embodiment of the present disclosure. FIG. 2C illustrates a schematic drawing of cutting the first sheet at a break angle to form the first top plate and the first supporting plate of one embodiment of the present disclosure. FIG. 2D illustrates a schematic drawing of cutting the first top plate to form the first foolproof sheet of one embodiment of the present disclosure. FIG. 2E illustrates a schematic drawing of bending the first foolproof sheet to form the first foolproof part of one embodiment of the present disclosure. FIG. 2F illustrates a schematic drawing of forming the first hole of one embodiment of the present disclosure. FIG. 2G illustrates a schematic drawing of forming the first arch bridge part and the first reinforcing rib to form the first hanging lug of one embodiment of the present disclosure. FIG. 2H illustrates a schematic drawing of combining the foolproof hole of the circuit board and the first foolproof part of one embodiment of the present disclosure. FIG. 3A illustrates a schematic drawing of cutting the bottom shell to form the second sheet of one embodiment of the present disclosure. FIG. 3B illustrates a schematic drawing of bending the second sheet of one embodiment of the present disclosure. FIG. 3C illustrates a schematic drawing of cutting the second sheet to form the second top plate and the second supporting plate of one embodiment of the present disclosure. FIG. 3D illustrates a schematic drawing of bending the second top plate and the second supporting plate of one embodiment of the present disclosure. FIG. 3E illustrates a schematic drawing of forming the second hole and the second reinforcing rib to form the second hanging lug of one embodiment of the present disclosure. FIG. 3F illustrates another schematic drawing of the second hanging lug of one embodiment of the present disclosure. FIG. 4A illustrates a schematic drawing of cutting one of the side shells to form the third sheet at the junction of any two neighboring side shells of one embodiment of the present disclosure. FIG. 4B illustrates a schematic drawing of bending the third sheet of one embodiment of the present disclosure. FIG. 4C illustrates a schematic drawing of cutting the third top plate to form the third foolproof sheet of one embodiment of the present disclosure. FIG. 4D illustrates a schematic drawing of bending the third foolproof sheet to form the third foolproof part of one embodiment of the present disclosure. FIG. 4E illustrates a schematic drawing of forming the third hole of one embodiment of the present disclosure. FIG. 4F illustrates a schematic drawing of forming the third arch bridge part to form the third hanging lug of one embodiment of the present disclosure. FIG. 4G illustrates a schematic drawing of combining the foolproof hole of the circuit board and the third foolproof part of one embodiment of the present disclosure. FIG. 5A illustrates a schematic drawing of cutting the side shell and the bottom shell to form the fourth sheet at the junction of one of the side shells and the bottom shell of one embodiment of the present disclosure. FIG. 5B illustrates a schematic drawing of bending the fourth sheet to form the fourth top plate and the fourth supporting plate of one embodiment of the present disclosure. FIG. 5C illustrates a schematic drawing of forming the fourth hole to form the fourth hanging lug of one embodiment of the present disclosure. FIG. 6 illustrates the first part of the flowchart of the method of forming hanging lug in electronic device case of one embodiment of the present disclosure. FIG. 7 illustrates the second part of the flowchart of the method of forming hanging lug in electronic device case of one embodiment of the present disclosure. FIG. 8 illustrates the third part of the flowchart of the method of forming hanging lug in electronic device case of one embodiment of the present disclosure. FIG. 9 illustrates the fourth part of the flowchart of the method of forming hanging lug in electronic device case of one embodiment of the present disclosure.

As shown in FIG. 1, the electronic device case 1 of the present disclosure can be a case of any electronic device, such as a computer, a screen, a cellphone or a tablet computer, for locking the circuit board 100 such that the circuit board 100 is combined with the electronic device case 1 stably. In one embodiment of the present disclosure, the electronic device case 1 includes a bottom shell 10, four side shells 20, **20*a*, a first hanging lug 30, a second hanging lug 40, a third hanging lug 50 and a fourth hanging lug 60. The circuit board 100 includes a plurality of screw holes 110, 110*a*, 110*b*, 110*c* and a plurality of foolproof holes 120, 120*a***.

As shown in FIG. 1, the electronic device case 1 is a rectangular case. The two side shells 20 of the four side shells 20, **20*a* are the long side shells of the rectangular case, and the two side shells 20*a* are the short side shells of the rectangular case. The four side shells 20, 20*a* are connected to the bottom shell 10; however, the number of the side shells 20, 20*a* is not limited to four and can be changed according to the shape design of the electronic device case 1. The thickness of the bottom shell 10 and the side shells 20, 20*a* of the present disclosure is 4 millimeters, but the thickness of the bottom shell 10 and the side shells 20, 20*a* is not limited to that design and can be changed to any size of 0.38 to 0.52 millimeters. Because the thickness of 4 millimeters of the bottom shell 10 and the side shells 20, 20*a* of the present disclosure is thinner than that of the case of the prior art (the thickness of the prior art is usually greater than 6 millimeters), the material cost of the electronic device case 1** of the present disclosure is cheaper than that of the case of the prior art.

As shown in FIG. 1, and FIG. 2F to FIG. 2H, in one embodiment of the present disclosure, the first hanging lug 30 is located at the center of one of the long side shells 20, but the position of the first hanging lug 30 is not limited to that design and can be located at another position on a long side shell 20 or on a short side shell 20*a*. The first hanging lug 30 includes a first top plate 32, a first supporting plate 33, a first hole 34, a first arch bridge part 35, a first reinforcing rib 36 and a first foolproof part 37. The first top plate 32 is used for supporting the circuit board 100, and a distance between the first top plate 32 and the bottom shell 10 is between 15 and 35 millimeters; therefore, when the circuit board 100 is placed on the first top plate 32, the electronic components of the circuit board 100 (such as resistors and memory chips) can be placed in the space between the first top plate 32 and the bottom shell 10, and the electronic components will be prevented from touching the bottom shell 10 and thereby becoming damaged. The first supporting plate 33 is connected to the first top plate 32 and the side shell 20, and the first supporting plate 33 is used for supporting the first top plate 32 to prevent the first top plate 32 from being deformed or otherwise affected by the load of the circuit board 100. The first hole 34 is located on the first top plate 32. The first hole 34 is used for overlapping with the screw hole 110 of the circuit board 100; the assembler can use a screw to lock the overlapping first hole 34 and screw hole 110 such that the circuit board 100 and the first hanging lug 30 are combined stably. The first arch bridge part 35 is connected to the side shell 20 and supports the first top plate 32 to prevent the first top plate 32 from being deformed or otherwise affected by the load of the circuit board 100. The first reinforcing rib 36 is located on the first supporting plate 33 and is used for enhancing the structural strength of the first supporting plate 33 to prevent the first supporting plate 33 from being deformed or otherwise affected by the load of the circuit board 100 and the first top plate 32. The first foolproof part 37 is located on the first top plate 32, the position of the first foolproof part 37 is corresponded to the foolproof hole 120 of the circuit board 100, and the shape of the first foolproof part 37 is corresponded to the foolproof hole 120 of the circuit board 100. The first foolproof part 37 is used for combining with the foolproof hole 120 for displaying the correct placement of the circuit board 100.

As shown in FIG. 1, FIG. 3C, FIG. 3E and FIG. 3F, in one embodiment of the present disclosure, the second hanging lug 40 is located in a position which is close to the corner on the rectangle bottom shell 10, but the position of the second hanging lug 40 is not limited to that design; the second hanging lug 40 can also be located at the center or another location of the bottom shell 10. The second hanging lug 40 includes a second top plate 42, a second supporting plate 43, a second hole 44 and a second reinforcing rib 45. The second top plate 42 is used for supporting the circuit board 100, and a distance between the second top plate 42 and the bottom shell 10 is between 15 and 35 millimeters. When the circuit board 100 is placed on the second top plate 42, the electronic components of the circuit board 100 can be placed in the space between the second top plate 42 and the bottom shell 10, and the electronic components will not touch the bottom shell 10 and thereby become damaged. The second supporting plate 43 is connected to the bottom shell 10. The second supporting plate 43 is used for supporting the second top plate 42 to prevent the second top plate 42 from being deformed or otherwise affected by the load of the circuit board 100. The second supporting plate 43 includes a second main supporting plate 431 and two second side supporting plates 432. The second main supporting plate 431 is connected to and supports the second top plate 42. Two second side supporting plates 432 are connected to the two sides of the second main supporting plate 431 and support the second top plate 42; however, the number of the second side supporting plates 432 is not limited to two. The second hole 44 is located on the second top plate 42. The second hole 44 is used for overlapping with the screw hole 110*b* of the circuit board 100; the assembler can use the screw to lock the overlapping second hole 44 and the screw hole 110*b* such that the circuit board 100 and the second hanging lug 40 are combined stably. The second reinforcing rib 45 is located on the second main supporting plate 431 and is used for enhancing the structural strength of the second main supporting plate 431 to prevent the second main supporting plate 431 from being deformed or otherwise affected by the load of the circuit board 100 and the second top plate 42.

As shown in FIG. 1, FIG. 4F and FIG. 4G, in one embodiment of the present disclosure, the third hanging lug 50 is located at a junction of any two neighboring side shells 20, 20*a*. The third hanging lug 50 includes a third top plate 52, a third hole 53, a third arch bridge part 54 and a third foolproof part 55. The third top plate 52 is connected to one side shell 20 of the two neighboring side shells 20, 20*a*, the third top plate 52 is used for supporting the circuit board 100, and the distance between the third top plate 52 and the bottom shell 10 is between 15 and 35 millimeters; when the circuit board 100 is placed on the third top plate 52, the electronic components of the circuit board 100 can be placed in the space between the third top plate 52 and the bottom shell 10, and the electronic components will not touch the bottom shell 10 and thereby become damaged; however, the third top plate 52 is not limited to being connected to the long side shell 20 and can also be connected to the short side shell 20*a*. The third hole 53 is located on the third top plate 52. The third hole 53 is used for overlapping with the screw hole 110*a* of the circuit board 100 such that the assembler can use the screw to lock the overlapping third hole 53 and screw hole 110*a* such that the circuit board 100 and the third hanging lug 50 are combined stably. The third arch bridge part 54 of this embodiment is connected to the other one side shell 20*a* of the two neighboring side shells 20, 20*a*. The third arch bridge part 54 supports the third top plate 52 to prevent the third top plate 52 from being deformed or otherwise affected by the load of the circuit board 100. The third foolproof part 55 is located on the third top plate 52, the position of the third foolproof part 55 is corresponded to the foolproof hole 120*a* of the circuit board 100, and the shape of the third foolproof part 55 is corresponded to the foolproof hole 120*a* of the circuit board 100. The third foolproof part 55 is used for combining with the foolproof hole 120*a* for displaying the correct placement of the circuit board 100.

As shown in FIG. 1 and FIG. 5C, in one embodiment of the present disclosure, the fourth hanging lug 60 is located at a junction of the bottom shell 10 and one of the side shells 20, 20*a*; however, the fourth hanging lug 60 is not limited to being located at the junction of the long side shell 20 and the bottom shell 10 and can also be located at the junction of the short side shell 20*a* and the bottom shell 10. The fourth hanging lug 60 includes a fourth top plate 62, a fourth supporting plate 63 and a fourth hole 64. The fourth top plate 62 is connected to the side shell 20 for supporting the circuit board 100, and a distance between the fourth top plate 62 and the bottom shell 10 is between 15 and 35 millimeters; when the circuit board 100 is placed on the fourth top plate 62, the electronic components of the circuit board 100 can be placed in the space between the fourth top plate 62 and the bottom shell 10, and the electronic components will not touch the bottom shell 10 and thereby become damaged. The fourth supporting plate 63 is connected to the fourth top plate 62 and the bottom shell 10. The fourth supporting plate 63 is used for supporting the fourth top plate 62 to prevent the fourth top plate 62 from being deformed or otherwise affected by the load of the circuit board 100. The fourth hole 64 is located on the fourth top plate 62. The fourth hole 64 is used for overlapping with the screw hole 110*c* of the circuit board 100 such that the assembler can use the screw to lock the overlapping fourth hole 64 and the screw hole 110*c* such that the circuit board 100 and the fourth hanging lug 60 are combined stably.

Now the method of forming hanging lug in electronic device case of the present disclosure will be described; the method of forming hanging lug in electronic device case is used for producing the first hanging lug 30, the second hanging lug 40, the third hanging lug 50 and the fourth hanging lug 60 of the electronic device case 1 shown in FIG. 1. First, please refer to FIG. 6 describing Step 101 to Step 106 of how to producing the first hanging lug 30.

Step 101: cutting the side shell to form a first sheet.

Figure 2B:
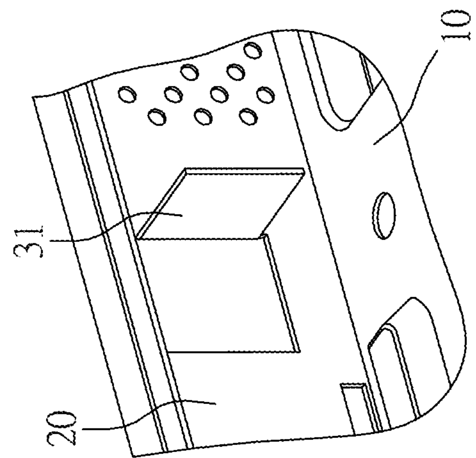
FIG. 2B illustrates a schematic drawing of bending the first sheet of one embodiment of the present disclosure.
Figure 2A:
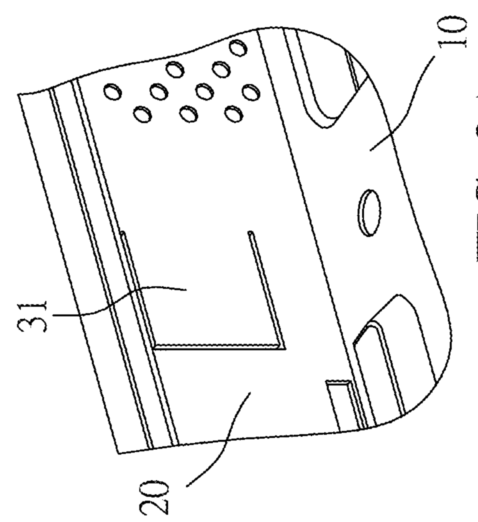
FIG. 2A illustrates a schematic drawing of cutting the side shell to form the first sheet of one embodiment of the present disclosure.

As shown in FIG. 2A, in one embodiment of the present disclosure, the assembler cuts one side shell 20 of the plurality of side shells 20, 20*a* to form the first sheet 31. The first sheet 31 of the present disclosure is a rectangular sheet; three sides of the first sheet 31 are separated from the side shell 20, and the remaining side of the first sheet 31 is connected to the side shell 20; however, the shape of the first sheet 31 is not limited to that design and can be changed according to the shape requirements of the first hanging lug 1.

Then, executing Step 102: bending the first sheet such that the first sheet is perpendicular to the side shell.

As shown in FIG. 2B, in one embodiment of the present disclosure, the assembler bends the first sheet 31 such that the side of the first sheet 31 which is connected to the side shell 20 is bent to an angle perpendicular to the side shell 20 for the assembler to execute the following cutting processing.

Then, executing Step 103: cutting the first sheet at a break angle to form a first top plate and a first supporting plate, wherein the first top plate is connected to the first supporting plate and the first supporting plate is connected to the side shell.

Figure 2D:
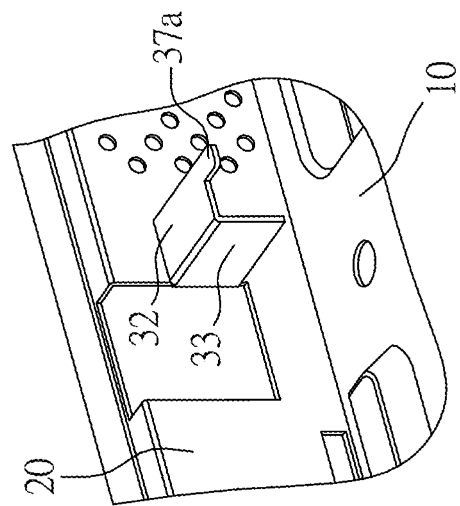
FIG. 2D illustrates a schematic drawing of cutting the first top plate to form the first foolproof sheet of one embodiment of the present disclosure.
Figure 2C:
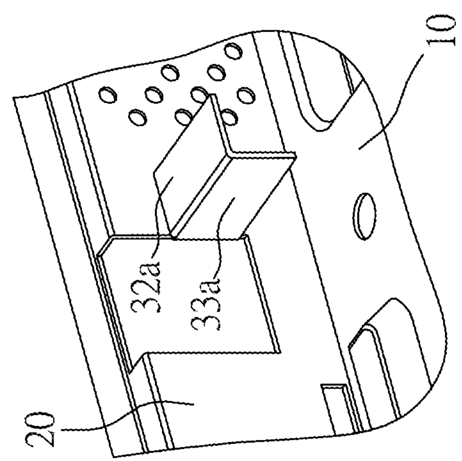
FIG. 2C illustrates a schematic drawing of cutting the first sheet at a break angle to form the first top plate and the first supporting plate of one embodiment of the present disclosure.

As shown in FIG. 2B and FIG. 2C, in one embodiment of the present disclosure, the assembler cuts one side of the first sheet 31, wherein this side of the first sheet 31 is connected to the side shell 20 such that part of the first sheet 31 and the side shell 20 will be separated; the part which is separated from the side shell 20 will form the first top plate 32*a*, and the part which is not separated from the side shell 20 will form the first supporting plate 33*a*.

Then, executing Step 104: bending the first top plate such that the first top plate is perpendicular to the first supporting plate.

As shown in FIG. 2C, in one embodiment of the present disclosure, the assembler bends the first top plate 32*a* such that the first top plate 32*a* is perpendicular to the first supporting plate 33*a*. At this moment, a distance between the first top plate 32*a* and the bottom shell 10 is between 15 and 35 millimeters.

Then, executing Step 105: cutting the first top plate to form the first foolproof sheet.

As shown in FIG. 2D, in one embodiment of the present disclosure, the assembler cuts a part of the first top plate 32*a* to form a first foolproof sheet 37*a* on the first top plate 32, wherein the part is corresponded to the foolproof hole 120 of the circuit board 100 shown in FIG. 1; in addition, the assembler also correspondingly cuts the first supporting plate 33*a* such that the length of the first supporting plate 33 and the length of the first top plate 32 are the same.

Then, executing Step 106: bending the first foolproof sheet to form a first foolproof part.

Figure 2G:
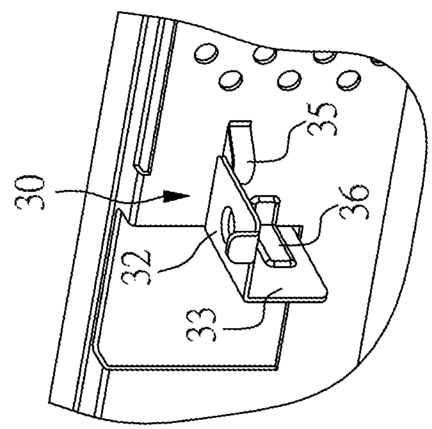
FIG. 2G illustrates a schematic drawing of forming the first arch bridge part and the first reinforcing rib to form the first hanging lug of one embodiment of the present disclosure.
Figure 2F:
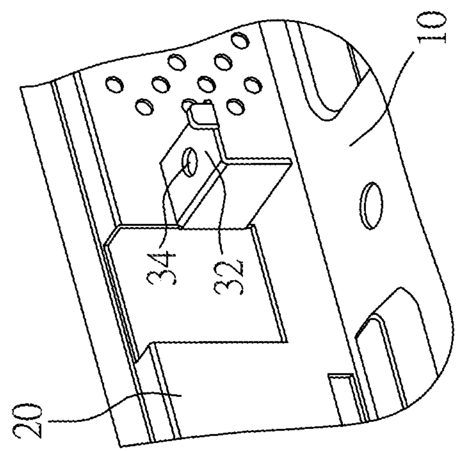
FIG. 2F illustrates a schematic drawing of forming the first hole of one embodiment of the present disclosure.
Figure 2E:
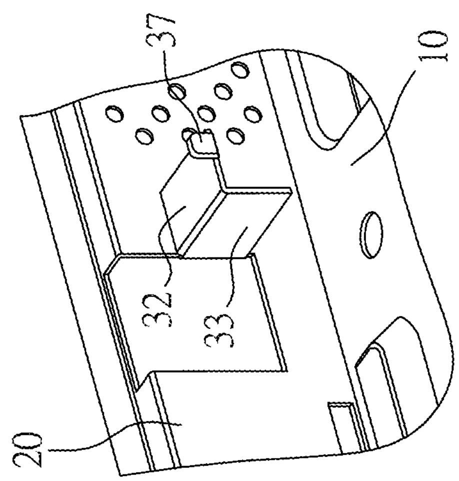
FIG. 2E illustrates a schematic drawing of bending the first foolproof sheet to form the first foolproof part of one embodiment of the present disclosure.
Figure 2H:
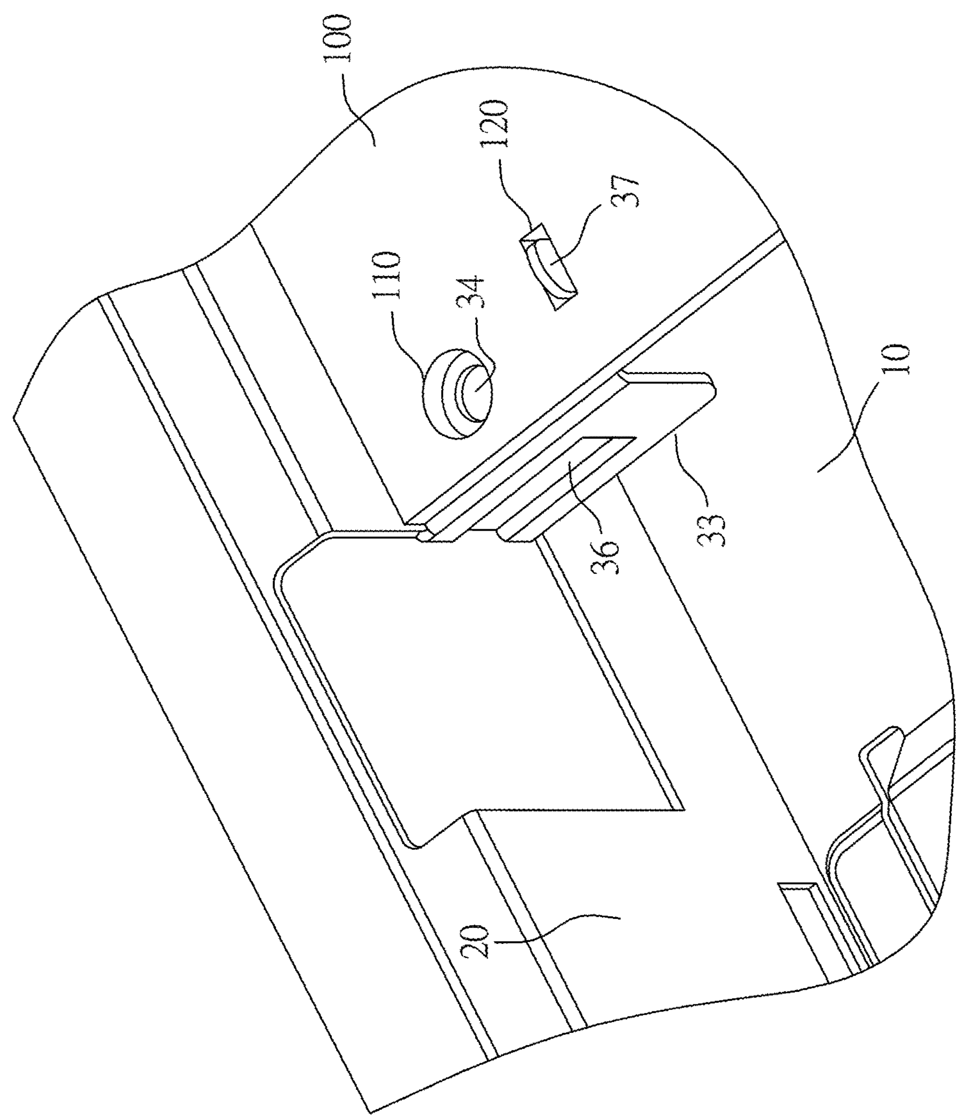
FIG. 2H illustrates a schematic drawing of combining the foolproof hole of the circuit board and the first foolproof part of one embodiment of the present disclosure.

As shown in FIG. 2D and FIG. 2E, in one embodiment of the present disclosure, the assembler bends the first foolproof sheet 37*a* to form the first foolproof part 37, wherein the first foolproof part 37 is substantially perpendicular to the first top plate 32.

Then, executing Step 107: perforating the first top plate to form a first hole.

As shown in FIG. 2F, in one embodiment of the present disclosure, the assembler perforates a position on the first top plate 32 to form a first hole 34, wherein the position is corresponded to the screw hole 110 of the circuit board 100 shown in FIG. 1.

Then, executing Step 108: stamping the first supporting plate to form a first reinforcing rib.

As shown in FIG. 2G, in one embodiment of the present disclosure, the assembler executes the stamping process on the first supporting plate 33 to form a first reinforcing rib 36 on the first supporting plate 33.

Then, executing Step 109: stamping the side shell under the first top plate to form a first arch bridge part, wherein the first arch bridge part supports the first top plate, thereby forming a first hanging lug.

As shown in FIG. 2G, in one embodiment of the present disclosure, the assembler executes the stamping process on the side shell 20 under the first top plate 32 to form the first arch bridge part 35, which supports the first top plate 32, whereby the first hanging lug 30 is formed.

Then, after the first hanging lug 30 is formed, as shown in FIG. 7, Step 110 to Step 116 are executed to produce the second hanging lug 40. Step 110: cutting the bottom shell to form a second sheet.

Figure 3C:
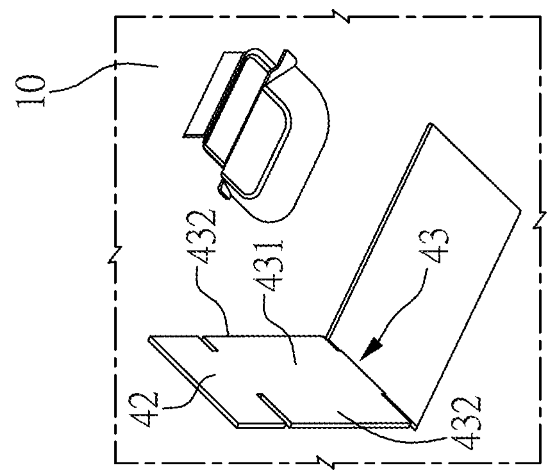
FIG. 3C illustrates a schematic drawing of cutting the second sheet to form the second top plate and the second supporting plate of one embodiment of the present disclosure.
Figure 3B:
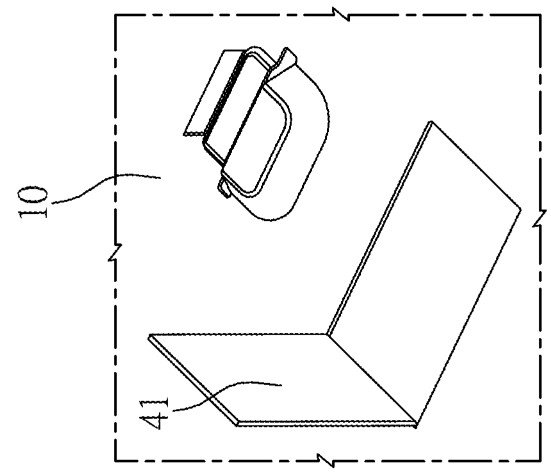
FIG. 3B illustrates a schematic drawing of bending the second sheet of one embodiment of the present disclosure.
Figure 3A:
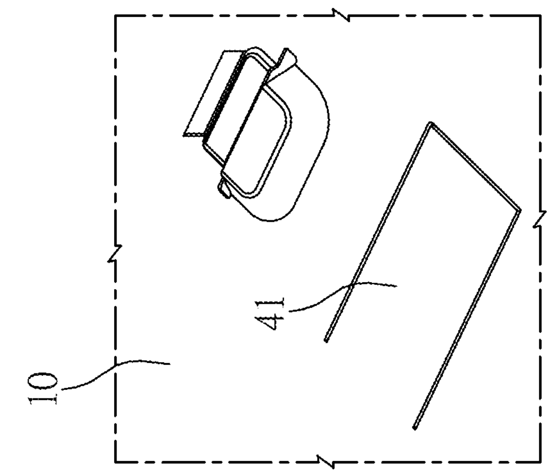
FIG. 3A illustrates a schematic drawing of cutting the bottom shell to form the second sheet of one embodiment of the present disclosure.

As shown in FIG. 3A, in one embodiment of the present disclosure, the assembler cuts the bottom shell 10 to form a second sheet 41; the second sheet 41 of the present disclosure is a rectangular sheet, three sides of the second sheet 41 are separated from the bottom shell 10, and the remaining side of the second sheet 41 is connected to the bottom shell 10; however, the shape of the second sheet 41 is not limited to that design and can be changed according to the shape requirements of the second hanging lug 40.

Then, executing Step 111: bending the second sheet such that the second sheet is perpendicular to the bottom shell.

As shown in FIG. 3B, in one embodiment of the present disclosure, the assembler bends the second sheet 41 such that the side of the second sheet 41 which is connected to the bottom shell 10 is bent to an angle perpendicular to the bottom shell 10, for the assembler to execute the following cutting processing.

Then, executing Step 112: cutting the second sheet to form a second top plate and a second supporting plate, wherein the second supporting plate comprises a second main supporting plate and at least one second side supporting plate, the second main supporting plate is connected to the second top plate and the bottom shell, and the at least one second side supporting plate is connected to the second main supporting plate.

As shown in FIG. 3B and FIG. 3C, in one embodiment of the present disclosure, the assembler cuts the center of the second sheet 41 such that the part which is away from the bottom shell 10 forms the second top plate 42, and the part which is close to the bottom shell 10 forms the second supporting plate 43. The assembler also cuts the side of the second sheet 41 which is connected to the bottom shell 10 such that part of the second supporting plate 43 of the second sheet 41 is separated from the bottom shell 10; the part which is separated from the bottom shell 10 forms the second side supporting plate 432, the part which is not separated from the bottom shell 10 forms the second main supporting plate 431, and the second main supporting plate 431 is connected to the second top plate 42, the bottom shell 10 and the second side supporting plate 432.

Then, executing Step 113: bending the second top plate such that the second top plate is perpendicular to the second main supporting plate.

Figure 3F:
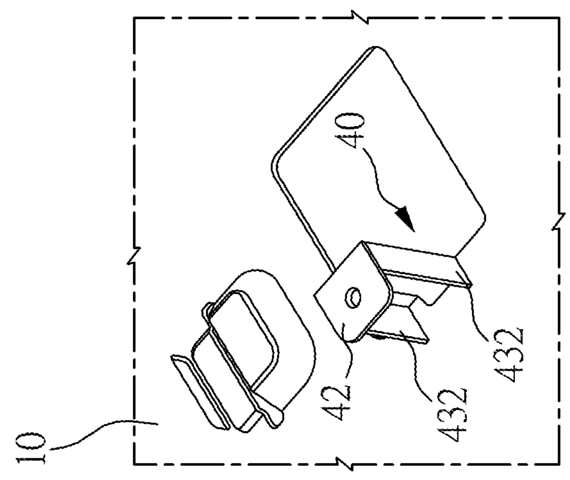
FIG. 3F illustrates another schematic drawing of the second hanging lug of one embodiment of the present disclosure.
Figure 3E:
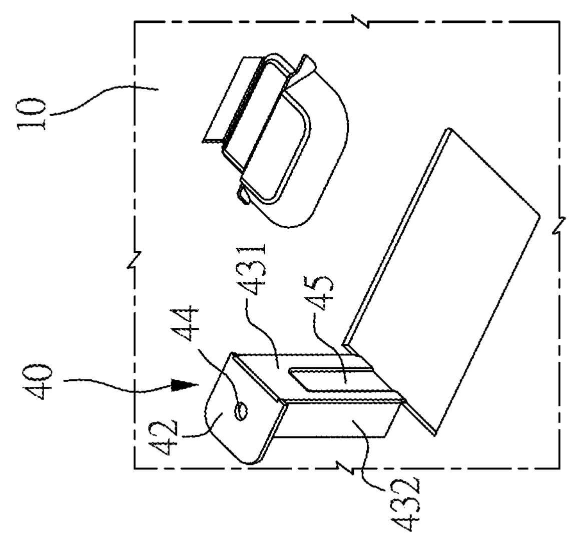
FIG. 3E illustrates a schematic drawing of forming the second hole and the second reinforcing rib to form the second hanging lug of one embodiment of the present disclosure.
Figure 3D:
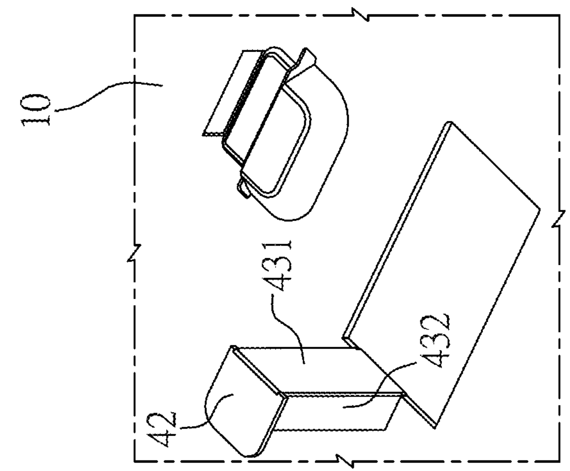
FIG. 3D illustrates a schematic drawing of bending the second top plate and the second supporting plate of one embodiment of the present disclosure.

As shown in FIG. 3D, in one embodiment of the present disclosure, the assembler bends the second top plate 42 such that the second top plate 42 is perpendicular to the second main supporting plate 431. At this moment, a distance between the second top plate 42 and the bottom shell 10 is between 15 and 35 millimeters.

Then, executing Step 114: bending the at least one second side supporting plate such that the at least one second side supporting plate supports the second top plate.

As shown in FIG. 3F, in one embodiment of the present disclosure, the assembler bends two second side supporting plates 432 such that the two second side supporting plates 432 support the second top plate 42 and are located between the second top plate 42 and the bottom shell 10.

Then, executing Step 115: stamping the second main supporting plate to form a second reinforcing rib.

As shown in FIG. 3E, in one embodiment of the present disclosure, the assembler executes a stamping process on the second main supporting plate 431 to form a second reinforcing rib 45 on the second main supporting plate 431.

Then, executing Step 116: perforating the second top plate to form a second hole, thereby forming a second hanging lug.

As shown in FIG. 3E, in one embodiment of the present disclosure, the assembler perforates a position on the second top plate 42 to form the second hole 44, wherein the position on the second top plate 42 is corresponded to the screw hole 110*b* of the circuit board 100 shown in FIG. 1, whereby the second hanging lug 40 is formed.

Then, after the second hanging lug 40 is formed, as shown in FIG. 8, Step 117 to Step 122 are executed to produce the third hanging lug 50. Step 117: at a junction of any two neighboring side shells, cutting one of the side shells to form a third sheet.

As shown in FIG. 4A, in one embodiment of the present disclosure, at a junction of any two neighboring side shells 20, 20*a*, the assembler cuts one side shell 20 to form the third sheet 51. The third sheet 51 of the present disclosure is a rectangular sheet, three sides of the third sheet 51 are separated from the side shell 20, and the remaining side is connected to the side shell 20; however, the shape of the third sheet 51 is not limited to that design and can be changed according to the shape requirements of the third hanging lug 50.

Then, executing Step 118: bending the third sheet such that the third sheet is perpendicular to the other one side shell to form a third top plate.

As shown in FIG. 4B, in one embodiment of the present disclosure, the assembler bends the third sheet 51 such that one side of the third sheet 51 which is connected to the side shell 20 is bent to an angle perpendicular to the side shell 20 to form the third top plate 52*a*. At this moment, a distance between the third top plate 52*a* and the bottom shell 10 is between 15 and 35 millimeters.

Then, executing Step 119: cutting the third top plate to form a third foolproof sheet.

As shown in FIG. 4C, in one embodiment of the present disclosure, the assembler cuts a position on the third top plate 52*a* to form a third foolproof sheet 55*a* on the third top plate 52, wherein the position is corresponded to the foolproof hole 120*a* of the circuit board 100 shown in FIG. 1.

Then, executing Step 120: bending the third foolproof sheet to form a third foolproof part.

As shown in FIG. 4C and FIG. 4D, in one embodiment of the present disclosure, the assembler bends the third foolproof sheet 55*a* to form a third foolproof part 55, wherein the third foolproof part 55 is substantially perpendicular to the third top plate 52.

Then, executing Step 121: perforating the third top plate to form a third hole.

As shown in FIG. 4E, in one embodiment of the present disclosure, the assembler perforates a position on the third top plate 52 to form a third hole 53, wherein the position is corresponded to the screw hole 110*a* of the circuit board 100 shown in FIG. 1.

Then, executing Step 122: stamping the other side shell under the third top plate to form a third arch bridge part, wherein the third arch bridge part supports the third top plate, thereby forming a third hanging lug.

As shown in FIG. 4F, in one embodiment of the present disclosure, the assembler executes a stamping process on the other side shell 20*a* under the third top plate 52 to form a third arch bridge part 54, and the third arch bridge part 54 supports the third top plate 52, whereby the third hanging lug 50 is formed.

Then, after the third hanging lug 50 is formed, as shown in FIG. 9, Step 123 to Step 125 are executed to produce the fourth hanging lug 60. Step 123: at a junction of one of the plurality of side shells and the bottom shell, cutting the one of the plurality of side shells and the bottom shell to form a fourth sheet.

As shown in FIG. 5A, in one embodiment of the present disclosure, at a junction of the bottom shell 10 and one of the side shells 20, the assembler cuts the side shell 20 and the bottom shell 10 to form a fourth sheet 61. The fourth sheet 61 of the present disclosure is a rectangular sheet, two sides of the fourth sheet 61 are separated from the side shell 20, the other side of the fourth sheet 61 is connected to the side shell 20, and the remaining side of the fourth sheet 61 is connected to the bottom shell 10; however, the shape of the fourth sheet 61 is not limited to that design and can be changed according to the shape requirements of the fourth hanging lug 60.

Then, executing Step 124: bending the fourth sheet such that a part of the fourth sheet is perpendicular to the bottom shell to form a fourth supporting plate, and bending another part of the fourth sheet such that the another part of the fourth sheet is perpendicular to the one of the plurality of side shells to form a fourth top plate, wherein the fourth top plate is connected to the one of the plurality of side shells and the fourth supporting plate is connected to the fourth top plate and the bottom shell.

As shown in FIG. 5B, in one embodiment of the present disclosure, the assembler bends the fourth sheet 61 such that the part of the fourth sheet 61 which is connected to the side shell 20 is perpendicular to the bottom shell 10 to form the fourth supporting plate 63; the part of the fourth sheet 61 which is connected to the bottom shell 10 is also bent perpendicular to the side shell 20 to form the fourth top plate 62. At this moment, a distance between the fourth top plate 62 and the bottom shell 10 is between 15 and 35 millimeters;

the fourth top plate 62 is connected to the side shell 20, and the fourth supporting plate 63 is connected to the fourth top plate 62 and the bottom shell 10.

Then, executing Step 125: perforating the fourth top plate to form a fourth hole, thereby forming a fourth hanging lug.

As shown in FIG. 5C, in one embodiment of the present disclosure, the assembler perforates a position on the fourth top plate 62 to form the fourth hole 64, wherein the position is corresponded to the screw hole 110*c* of the circuit board 100 shown in FIG. 1, whereby the fourth hanging lug 60 is formed.

Via the abovementioned method of forming hanging lug in electronic device case, the first hanging lug 30, the second hanging lug 40, the third hanging lug 50 and the fourth hanging lug 60 can be formed on the electronic device case 1. In an actual load experiment of the application of the present disclosure, it has been found that the first hanging lug 30 of the present disclosure can withstand a load of about 16.1 kg, the second hanging lug 40 can withstand a load of about 44.2 kg, the third hanging lug 50 can withstand a load of about 11.18, and the fourth hanging lug 60 can withstand a load of about 11 kg; therefore, via the method of forming hanging lug in electronic device case of the present disclosure, a hanging lug which can withstand a high load can be produced, and the first hanging lug 30, the second hanging lug 40, the third hanging lug 50 and the fourth hanging lug 60 of the present disclosure are made of sheets which are cut from the electronic device case 1, such that each hanging lug of the present disclosure will not incur any additional material cost. In addition, a thickness of the electronic device case 1 of the present disclosure is between 0.38 and 0.52 millimeters; this thickness of the electronic device case 1 is thinner than the thickness of the case of the prior art (which is usually greater than 0.6 millimeters); therefore, the electronic device case 1 of the present disclosure can be used for producing an electronic device with a light weight and great competitiveness. Furthermore, the first hanging lug 30, the second hanging lug 40, the third hanging lug 50 and the fourth hanging lug 60 of the present disclosure can support the circuit board 100 to prevent the circuit board 100 from touching the bottom shell 10 and thereby becoming damaged. Finally, the hanging lugs produced by the method of forming hanging lug in electronic device case of the present disclosure can be installed or removed along a direction which is perpendicular to the bottom shell 10, such that the assembler can easily install or remove the hanging lugs, to reduce the assembly time and cost.

It is noted that the above-mentioned embodiments are only for illustration. It is intended that the present disclosure cover modifications and variations of this disclosure provided they fall within the scope of the following claims and their equivalents. Therefore, it will be apparent to those skilled in the art that various modifications and variations can be made to the structure of the present disclosure without departing from the spirit and scope of the disclosure.

What is claimed is:

1. An electronic device case, comprising:
a bottom shell;
a plurality of side shells, connected to the bottom shell;
a first hanging lug, located on one of the side shells, the first hanging lug comprising:
a first top plate;
a first supporting plate, connected to the first top plate;
a first hole, located on the first top plate; and
a first arch bridge part, supporting the first top plate; and
a second hanging lug, located on the bottom shell, the second hanging lug comprising:
a second top plate; and
a second supporting plate, comprising a second main supporting plate and at least one second side supporting plate, wherein the second main supporting plate is connected to the second top plate, and the at least one second side supporting plate is connected to the second main supporting plate and supports the second top plate.

2. The electronic device case as claimed in claim 1, further comprising a third hanging lug, wherein the third hanging lug is located at a junction of any two neighboring side shells, and the third hanging lug comprises:
a third top plate, connected to one of the two neighboring side shells;
a third hole, located on the third top plate; and
a third arch bridge part, connected to the other one of the two neighboring side shells, and supporting the third top plate.

3. The electronic device case as claimed in claim 2, further comprising a fourth hanging lug, wherein the fourth hanging lug is located at a junction of one of the plurality of side shells and the bottom shell, and the fourth hanging lug comprises:
a fourth top plate, connected to the side shell;
a fourth supporting plate, connected to the fourth top plate and the bottom shell; and
a fourth hole, located on the fourth top plate.

4. The electronic device case as claimed in claim 3, wherein the second hanging lug further comprises a second hole, and the second hole is located on the second top plate.

5. The electronic device case as claimed in claim 4, wherein the first hanging lug further comprises a first reinforcing rib, and the first reinforcing rib is located on the first supporting plate.

6. The electronic device case as claimed in claim 5, wherein the first hanging lug further comprises a first foolproof part, and the first foolproof part is located on the first top plate.

7. The electronic device case as claimed in claim 6, wherein the second hanging lug further comprises a second reinforcing rib, and the second reinforcing rib is located on the second main supporting plate.

8. The electronic device case as claimed in claim 7, wherein the third hanging lug further comprises a third foolproof part, and the third foolproof part is located on the third top plate.

9. The electronic device case as claimed in claim 8, wherein a distance between the bottom shell and the first top plate, the second top plate, the third top plate and the fourth top plate is between 15 and 35 millimeters.

10. The electronic device case as claimed in claim 9, wherein a thickness of the bottom shell and the side shell is between 0.38 and 0.52 millimeters.

* * * * *